United States Patent [19]

Demarest et al.

[11] Patent Number: 5,793,634
[45] Date of Patent: Aug. 11, 1998

[54] METHOD AND SYSTEM FOR ESTABLISHING AND MONITORING A NEEDLE SWAGING PROCEDURE

[75] Inventors: David D. Demarest, Parsippany; Michael G. Hodulik, Dunellen; Teresa M. Shaw, Lawrenceville; Irwin J. Shiffer, Belle Mead; Anthony Esteves, Somerville, all of N.J.

[73] Assignee: Ethicon, Inc., Somerville, N.J.

[21] Appl. No.: 804,476

[22] Filed: Feb. 21, 1997

[51] Int. Cl.[6] ................................................ G06F 19/00
[52] U.S. Cl. ............... 364/468.24; 29/705; 364/474.02
[58] Field of Search ............ 364/468.24, 468.15–468.17, 364/472.01, 474.02, 551.01, 551.02; 29/705, 517; 72/416; 73/826–828, 830, 831, 834; 606/224–227

[56] References Cited

U.S. PATENT DOCUMENTS

| | | | |
|---|---|---|---|
| 4,072,041 | 2/1978 | Hoffman et al. | 72/416 |
| 5,487,308 | 1/1996 | Demarest et al. | 73/827 |
| 5,495,420 | 2/1996 | Demarest et al. | 364/468.24 |

*Primary Examiner*—Paul P. Gordon
*Assistant Examiner*—Steven R. Garland

[57] ABSTRACT

Procedures for adjusting or reseting the pressure used to swage needles to suture at a needle swaging station. The forces required to break the sutures from the needles are measured and added to a data base; and each time a value, or sample, is added to that data base, an average of all the sample values in the data base is calculated. Each time an average value is calculated, that value is compared to a first range, referred to as a reject range. If any calculated average value falls outside that reject range, then the swaging pressure is adjusted and the procedure is restarted, with a new, or empty, data base. Also, once the sample reaches a given size, such as eight or nine samples, the calculated average values are also compared to a second range, referred to as an accept range, and which is within and narrower than the reject range. If a calculate average value is within this accept range, the swaging pressure is considered acceptable and the procedure terminates immediately.

11 Claims, 9 Drawing Sheets

```
DATA    SIZE 0 NEW;
        LIMIT_HI = 122.4;
        LIMIT_LO =  51.9;
        SIGMA = 24;
        TARGET = (LIMIT_HI + LIMIT_LO)/2;
        DEL = (LIMIT_HI - LIMIT_LO)/2;
        ALPHA = .005;
        BETA = .01;
        A = LOG((1-BETA)/ALPHA);
        B = LOG(BETA/(1-ALPHA));
        H0 = B* SIGMA**2/DEL;
        H1 = A* SIGMA**2/DEL;
        DO N = 1 TO 28;
        DELTA0 = H0/N + DEL/2;
        DELTA1 = H1/N + DEL/2;
        T0_HI = TARGET + DELTA0;
        T1_HI = TARGET + DELTA1;
        T0_LO = TARGET - DELTA0;
        T1_LO = TARGET - DELTA1;

IF (T0_LO GT TARGET) OR
            (T0_LO LT 0) THEN T0_LO=.;
        IF T0_HI LT TARGET THEN T0_HI=.;
        IF (T1_LO GT TARGET) OR
            (T1_LO LT 0) THEN T1_LO=.;
        IF T1_HI LT TARGET THEN T1_HI=.;
```

FIG. 10

METHOD AND SYSTEM FOR ESTABLISHING AND MONITORING A NEEDLE SWAGING PROCEDURE

BACKGROUND OF THE INVENTION

This invention generally relates to machines that are used to suture and swage surgical needles. More specifically, the invention relates to procedures for initializing, or setting-up, these machines, or parts of the machines, and to procedures for monitoring the performances of the machines.

Machines have recently been developed that automatically suture and swage surgical needles; and, for example, such machines are disclosed in U.S. Pat. Nos. 5,495,420, 5,487,216 and 5,487,212. Generally, in the operation of these machines, unsutured needles are fed to the machines, and indefinite lengths of suture, taken from a spool or another suitable supply, are inserted into recesses or openings in the needles. The needles are swaged in the areas of those recesses or openings to secure the connections between the sutures and the needles, and the sutures are cut to preset lengths. As disclosed in the above-identified U.S. Patents, these machines may be used in conjunction with other machines that automatically package the sutured needles.

These machines have proven to be highly valuable, and they effectively produce large numbers of excellent quality sutured needles. Morover, these needles are produced very economically on a large scale, high speed, mass production basis.

These machines, and more specifically various components of the machines, are periodically initialized, or set-up, to set or adjust aspects or parameters of the machines. For instance, the pressure used to swage the sutures to the needles may be set, reset or adjusted at different times. For example, if the type of needle being fed to the machine changes, or if the type of suture used on the machine changes, then it may be preferred to reset the swaging pressure. Also, over time, the swaging pressure may change, or drift, due to normal wear on the swaging machinery, necessitating an adjustment to the swaging pressure.

With one prior art procedure for setting the swaging pressure, a pull test is applied to the sutured and swaged needles, and the swaging pressure is adjusted on the basis of those test results. To elaborate, in the pull test, a suture on a needle is pulled with an increasing force to break the suture from the needle, and the magnitude of the pulling force actually needed to break the suture from the needle is measured. This pull test is repeated a number of times, each time with a different needle. Each time the pull test is completed, the magnitude of the force needed to break the suture from the needle is recorded in a data base, and an average of the sample suture breaking forces in that data base is calculated.

Also, each time an average value is calculated, the swaging pressure is increased or decreased, depending on whether the calculated average value is, respectively, below or above a target value. This procedure continues, with each new measured suture breaking force being added to the data base to increase the number of sample values held therein, until one of two events occurs. First, if any calculated average breaking force is outside a defined range, referred to as a tolerance range, the data base is cleared, and the procedure is restarted with a new, empty data base. Second, if the data base reaches a predetermined sample size, such as twenty eight samples, and if each average value calculated from that sample is within the tolerance range, the swaging pressure is considered acceptable. This procedure for setting the swaging pressure is very effective, however it can also be somewhat time consuming.

SUMMARY OF THE INVENTION

An object of this invention is to improve procedures for determining a pressure for swaging sutures to needles.

Another object of the present invention is to identify a swaging pressure, which is used for swaging sutures to needles, as acceptable if, after pull testing a limited number of needle samples, the average force needed to break the sutures from the needles is within an acceptance range.

A further object of this invention is to use an acceptance range, inside a tolerance range, to identify rapidly when a needle swaging pressure is acceptable.

These and other objectives are obtained with a procedure for adjusting or resetting the pressure used to swage needles to suture. Generally, in the procedure, the forces required to break the sutures from the needles are measured and added to a data base; and each time a value, or sample, is added to that data base, an average of all the sample values in the data base is calculated. Each time an average value is calculated, that value is compared to a first range, referred to as a reject range. If any calculated average value falls outside that reject range, then the swaging pressure is adjusted and the procedure is restarted, with a new, or empty, data base.

In addition to the foregoing, once the sample reaches a given size, such as eight or nine samples, the calculated average values are also compared to a second range, referred to as an accept range, and which is within and narrower than the reject range. If a calculate average value is within this accept range, the swaging pressure is considered acceptable and the procedure terminates immediately.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 10 shows data and equations that may be used to determine the tolerance and accept ranges of FIG. 9.

DETAILED DESCRIPTION OF THE PREFERRED EMBODIMENTS

Figure 1:
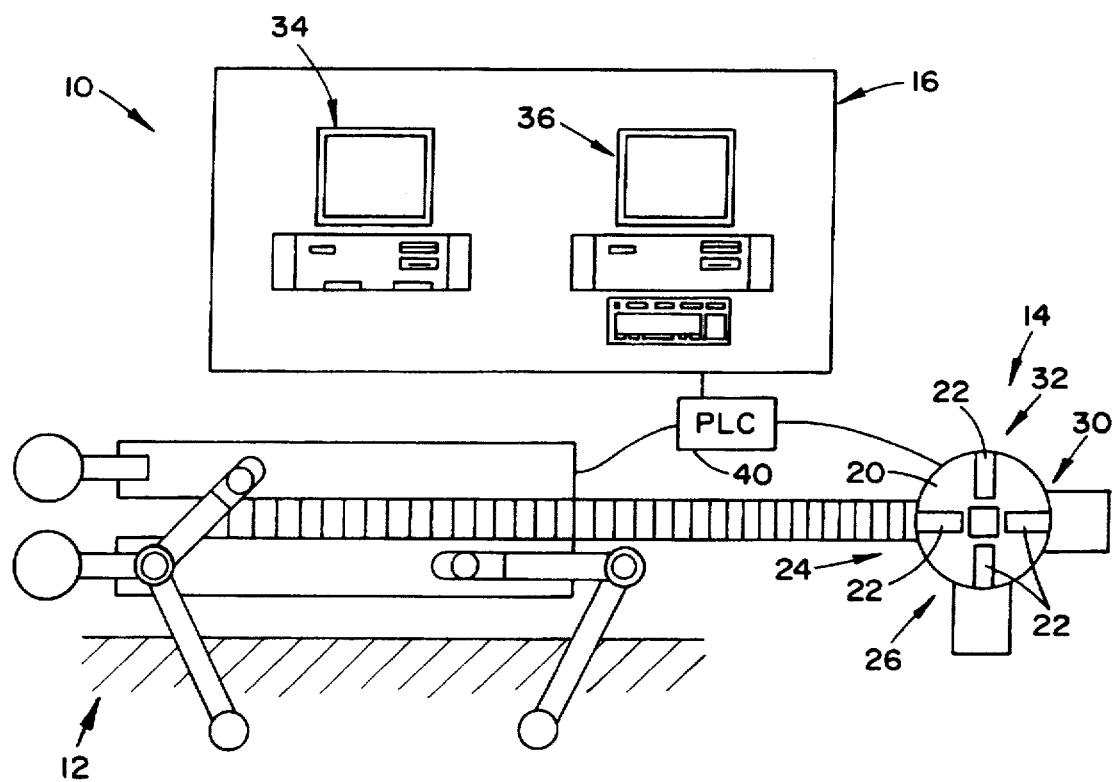
FIG. 1 is a diagrammatic view of a needle threading and swaging machine.
Figure 2:
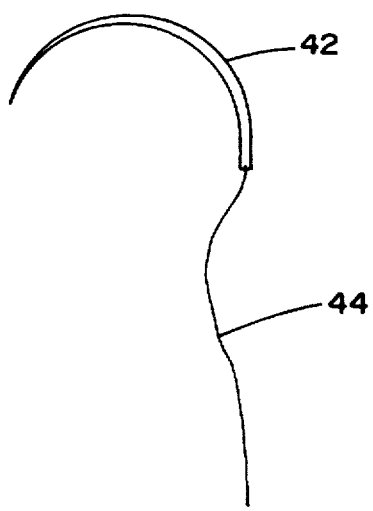
FIG. 2 shows a needle that has been sutured on the machine of FIG. 1.
Figure 3:
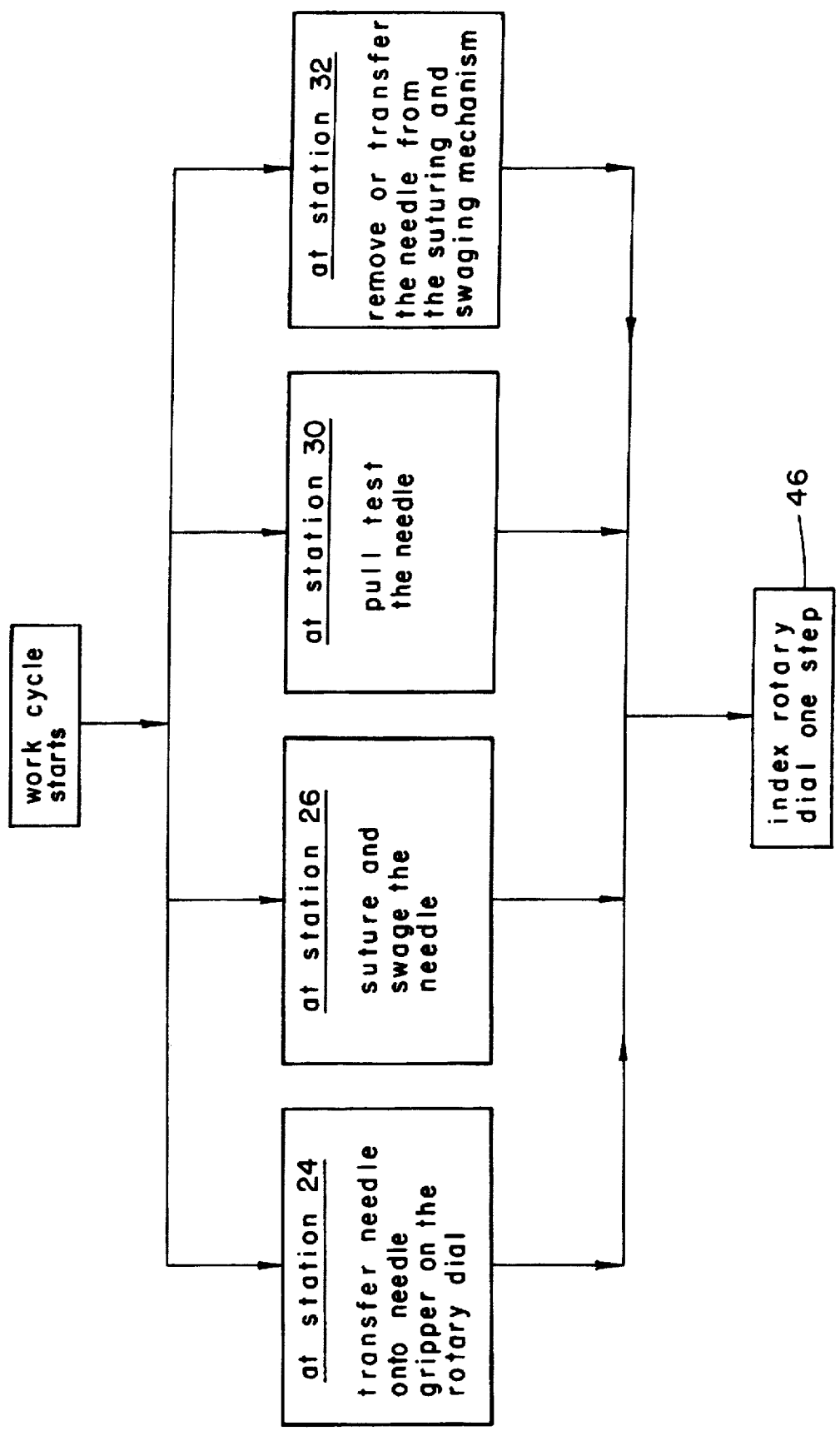
FIG. 3 is a flow chart illustrating the general operation of the machine.
Figure 4:
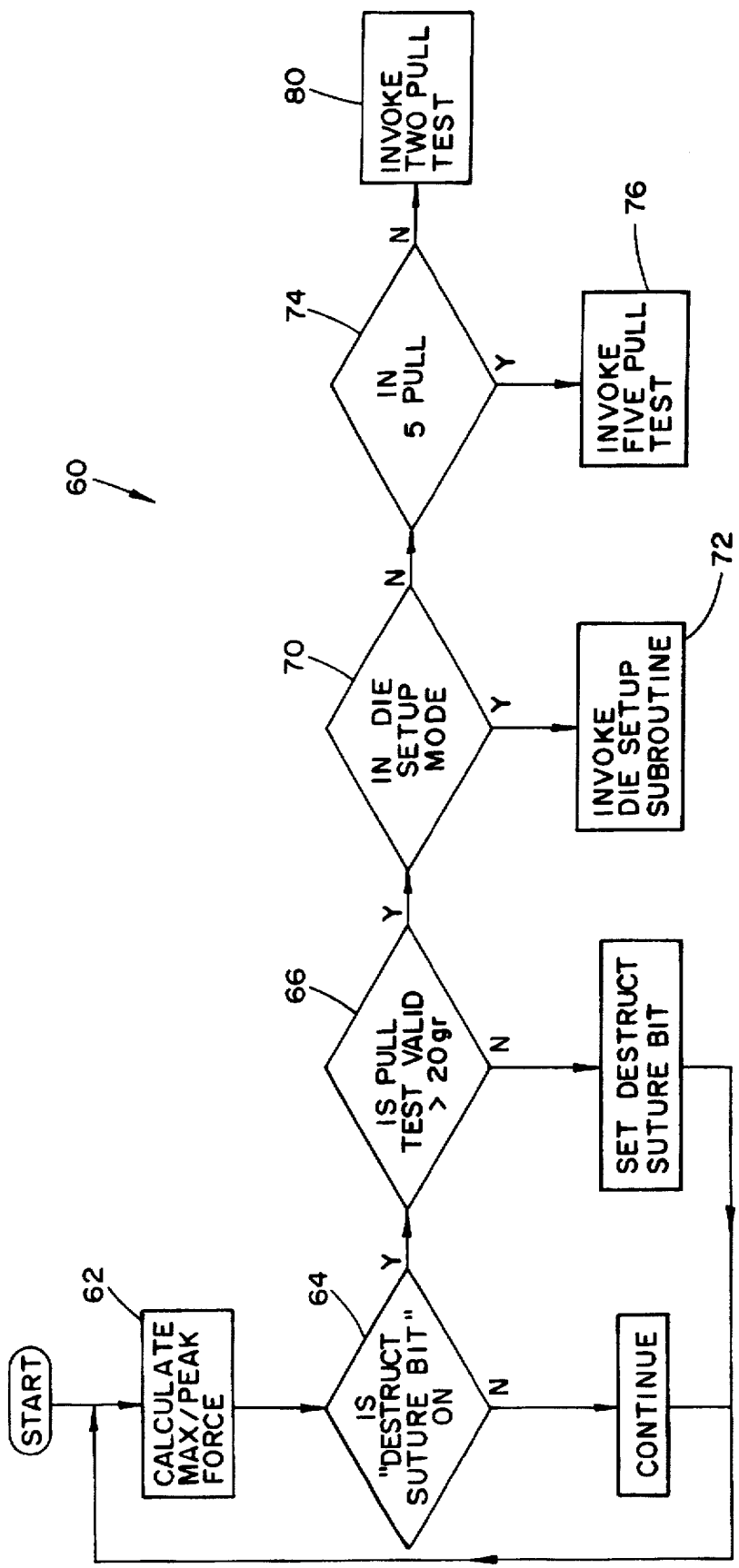
FIG. 4 is a flow chart generally showing a procedure for analyzing and using the results of pull tests to set or adjust the needle swaging pressure on the machine of FIG. 1.

FIG. 1 shows machine 10 for automatically threading and swaging surgical needles, and this machine comprises needle sorting and conveying mechanism 12, needle suturing and swaging mechanism 14 and control system 16.

fact, and at step 70, processor 40 checks to determine whether this bit has been set. If this bit is set, the procedure 60 proceeds through subroutine 72, discussed in detail below. If this die set-up bit is not set, then the procedure 60 moves on to step 74.

At step 74, routine 60 determines which of two analyses, referred to as the two pull and the five pull tests, should be invoked. Generally, the two pull test is a preliminary or screening test and analyzes the results of two successive valid destructive pull tests to determine whether the five pull test should be invoked, and the five pull test is used to determine whether the swaging pressure should be adjusted.

The decision of which of these two tests to invoke is determined by the state of a bit or flag, referred to as the five pull bit, in processor 40; and at step 74, the processor checks this bit. If the five pull test is to be invoked, the routine then proceeds through subroutine 76; while if the two pull test is to be invoked, the routine proceeds through subroutine 80.

Figure 5:
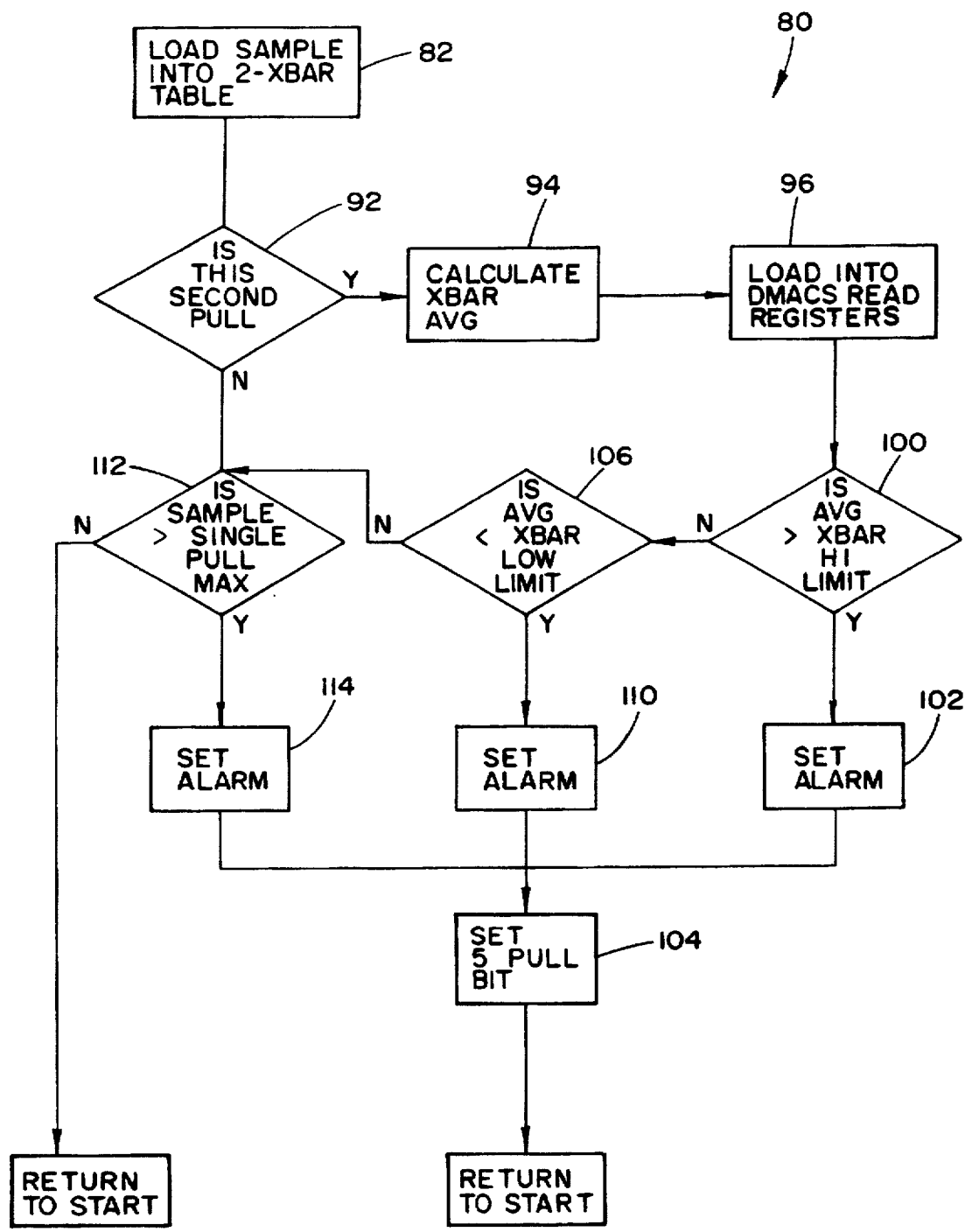
FIGS. 5, 6 and 7 are flow charts illustrating subroutines used in the procedure outlined in FIG. 4.
Figure 8:
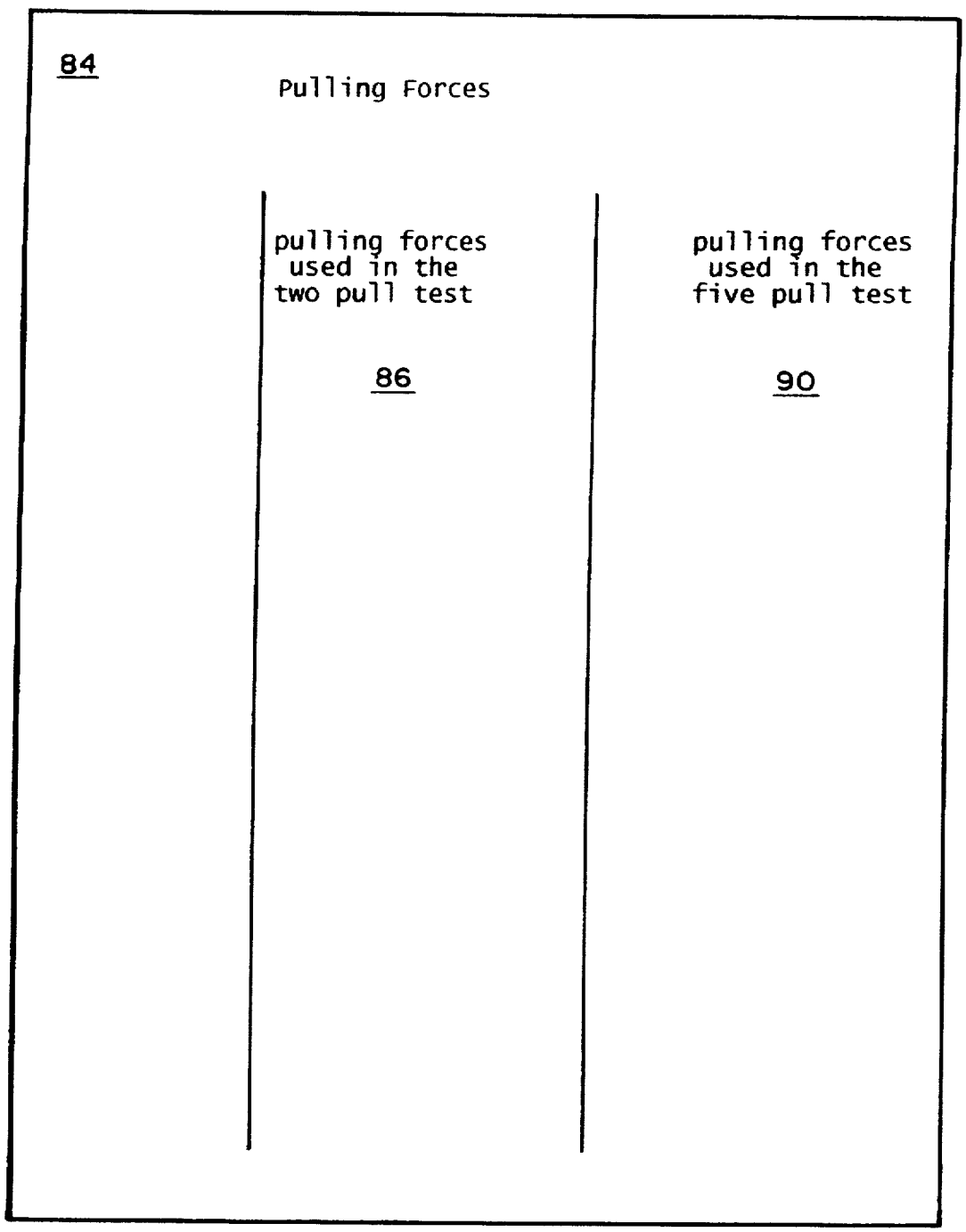
FIG. 8 is a table for holding data that may be used in the subroutines of FIGS. 5 and 6.

With reference to FIG. 5, the first step 82 in subroutine 80 is to record the results of the pull test in a table in a manner that indicates that the results are being used in the two pull test. For instance, FIG. 8 shows a table 84 having one column 86 for pull test dats used in the two pull test and a second column 90 for pull test data used in the five pull test; and at step 82, the results of the latest suture pull test are recorded in column 86.

At step 92, the subroutine 80 determines whether the latest suture pull test is the first or the second of the two suture pull tests that are to be used in the two pull test 80. If the subroutine 80 determines that the latest test is the second of these two pull tests, the subroutine proceeds to step 94, where processor 40 determines the average of the pull forces calculated during these two pull tests. That average is then loaded into a register, at step 96, for record keeping purposes, and then the calculated average value is compared to an upper limit at step 100. If the calculated average is above that upper limit, an alarm is set at step 102, the five pull test bit is set at step 104, and the subroutine returns to the start step.

If, at step 100, the calculated average is below the upper limit, that average value is then, at step 106, compared to a lower limit. If the calculated average is also below that lower limit, an alarm is set at step 110, the five pull test bit is set at step 104, and the subroutine returns to the start step. If, at step 106, the calculated average is above the lower limit, then the subroutine 80 proceeds to step 112, where the last calculated pulling force is compared to another upper limit value, referred to as the single pull max. This upper limit represents a preferred maximum allowable value for the force required to break a suture from a needle.

If, at step 112, the last pulling force value is less than that maximum pulling force limit, then the subroutine returns to the start step. In contrast, if that maximum value is exceeded in any pull test, an alarm bit is set at step 114, and the five pull test bit is set at step 104, so that during the next operation of routine 60, the five pull test 76 is invoked. Then, from step 104, the subroutine returns to the start step.

If at step 92 the subroutine 80 determines that the latest suture pull test is the first such pull test to be considered in the two pull test, a bit or flag is set to indicate this fact and the subroutine then proceeds directly to step 112, skipping steps 94, 96, 100 and 106. Again, at step 112, the subroutine compares the latest calculated pulling force to the single pull max. If the pulling force value is less than that maximum value, the subroutine 80 returns to the start step; while if the pulling force value is greater than that maximum value, an alarm bit is set at step 114, and the five pull test bit is set at step 104.

Figure 6:
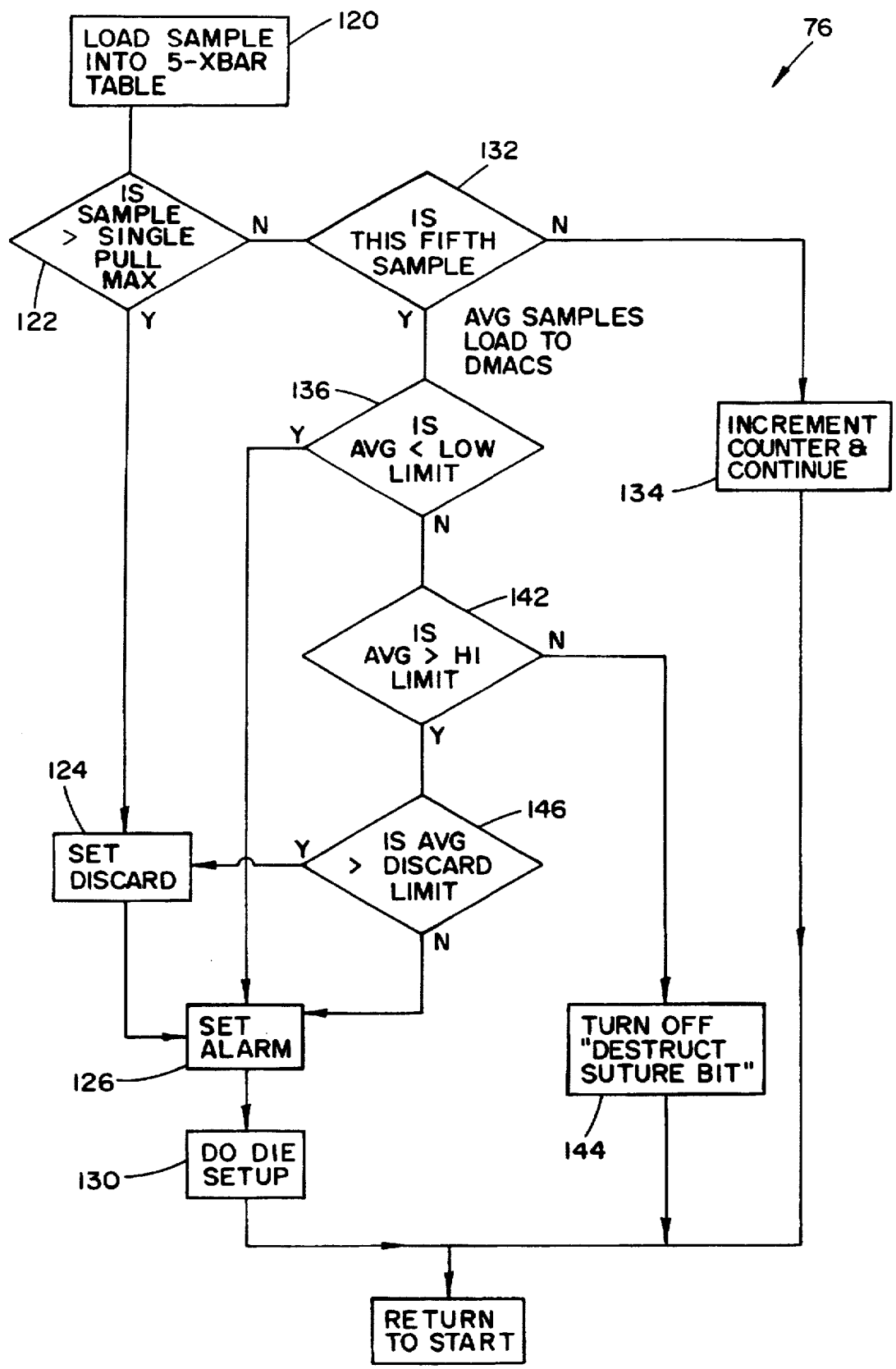

With reference to FIG. 6, the first step 120 in the five pull test subroutine 80 is to store the latest pulling force value or sample in the five pull test column 90 of table 84. Then, at step 122, the pulling force of the last suture pull test is compared to the single pull max. If this pulling force is greater than that maximum allowable single pulling force value, a discard alarm is generated at step 124. This alarm is intended to advise the operator that a number of needles might have been swaged too tightly and that it might be preferred to discard those needles. Then, at step 126, an internal alarm bit is set; at step 130, the die set up bit is set; and then subroutine 76 returns to the start step.

If at step 122, the calculated pulling force of the latest suture pulling test is not greater than the single pull max value, then subroutine 76 proceeds to step 132, where the processor 40 tests to determine whether the latest suture pull test is the fifth of the set of five suture pull tests that are to be used for the five pull test. If the latest suture pull test is not that fifth test, a count of the number of valid pull tests in that set is incremented by one at step 134, and then the subroutine returns to the start step.

If, though, at step 132, the latest suture pull test is the fifth of the five suture pull tests that are needed for the five pull test, then the subroutine 80 calculates the average of the pulling forces of those five pull tests; and then the subroutine goes to step 136, where that average is compared to a lower limit value. If the calculated average is below that lower limit, then an internal alarm is set at step 126, the die set-up bit is set at step 130, and the routine returns to the start step. If, at step 136, the calculated average is above the lower limit, then that calculated average is compared to an upper limit at step 142. If the calculated average value is not above this upper limit, then the destruct suture bit is cleared at step 144 so that a non-destructive pull test is applied to the next needle positioned at work station 30; and from step 144, the subroutine returns to the start step.

If at step 142, the calculated average is above the upper limit, then, at step 146, that calculated average value is compared to a higher value, referred to as the discard limit. If this discard limit is exceeded, then, not only is it appropriate to invoke the die set-up subroutine, but also it may be appropriate to discard the most recently sutured needles, as they may have been sutured too tightly. In particular, if that discard limit is exceeded, the discard alarm is set at step 124, an internal alarm flag is set at step 126, and the die set up bit is set at step 130. If the discard limit is not exceeded at step 146, the subroutine directly proceeds to steps 126 and 130, where the internal alarm flag and the die set-up bit are set. From step 130, the subroutine returns to the start step.

Figure 7:
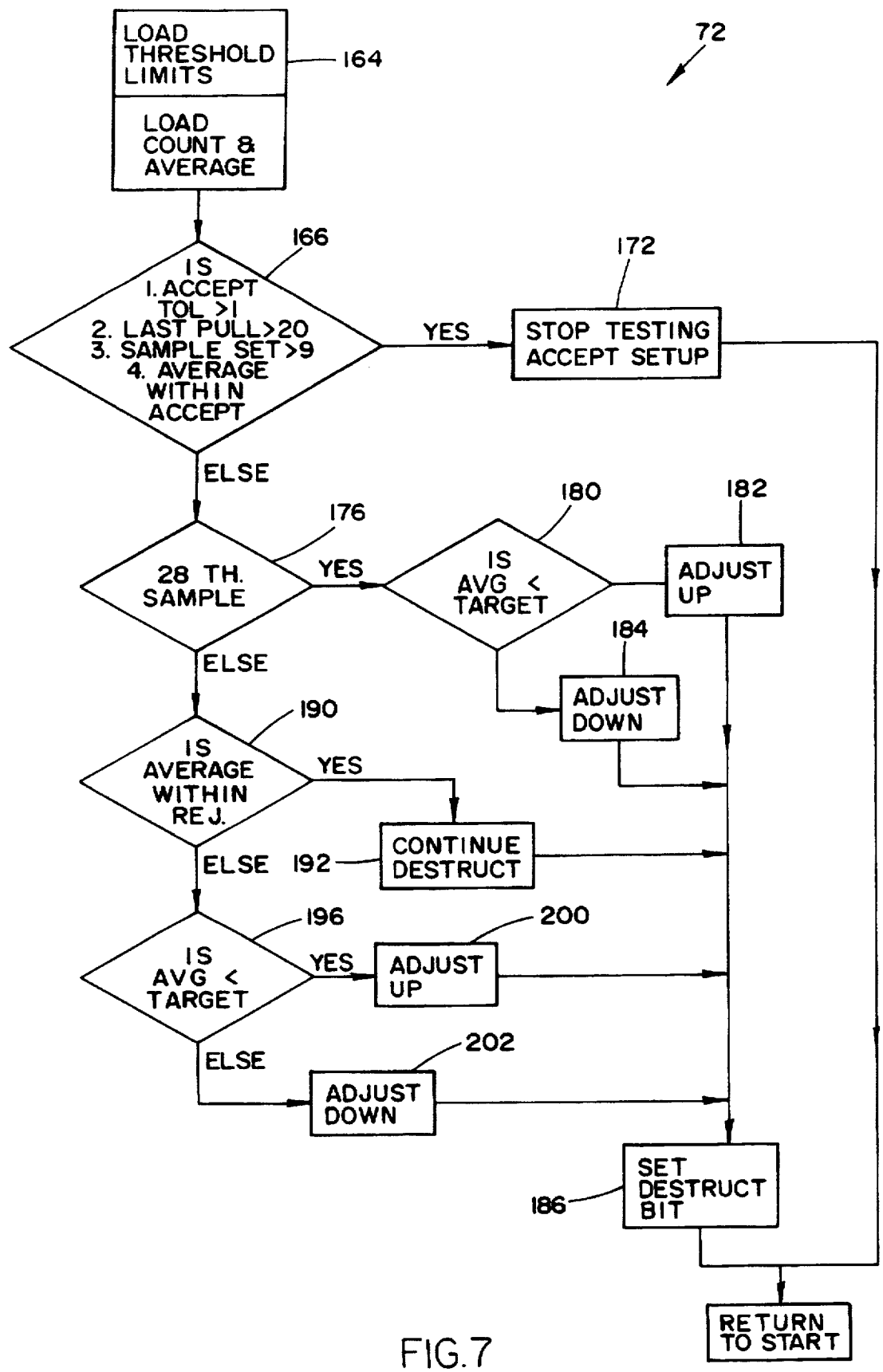

Subroutine 72, shown in FIG. 7, is the procedure for setting or adjusting the swaging dies; and, as previously mentioned, this subroutine is invoked when, at step 70, the die set-up bit is set. This subroutine 72 is used during set-up or initialization of machine 10 to determine an acceptable swaging pressure, and this subroutine is also used during operation of the machine to adjust or reset that swaging pressure in response to changes or drifts in that pressure.

Figure 9:
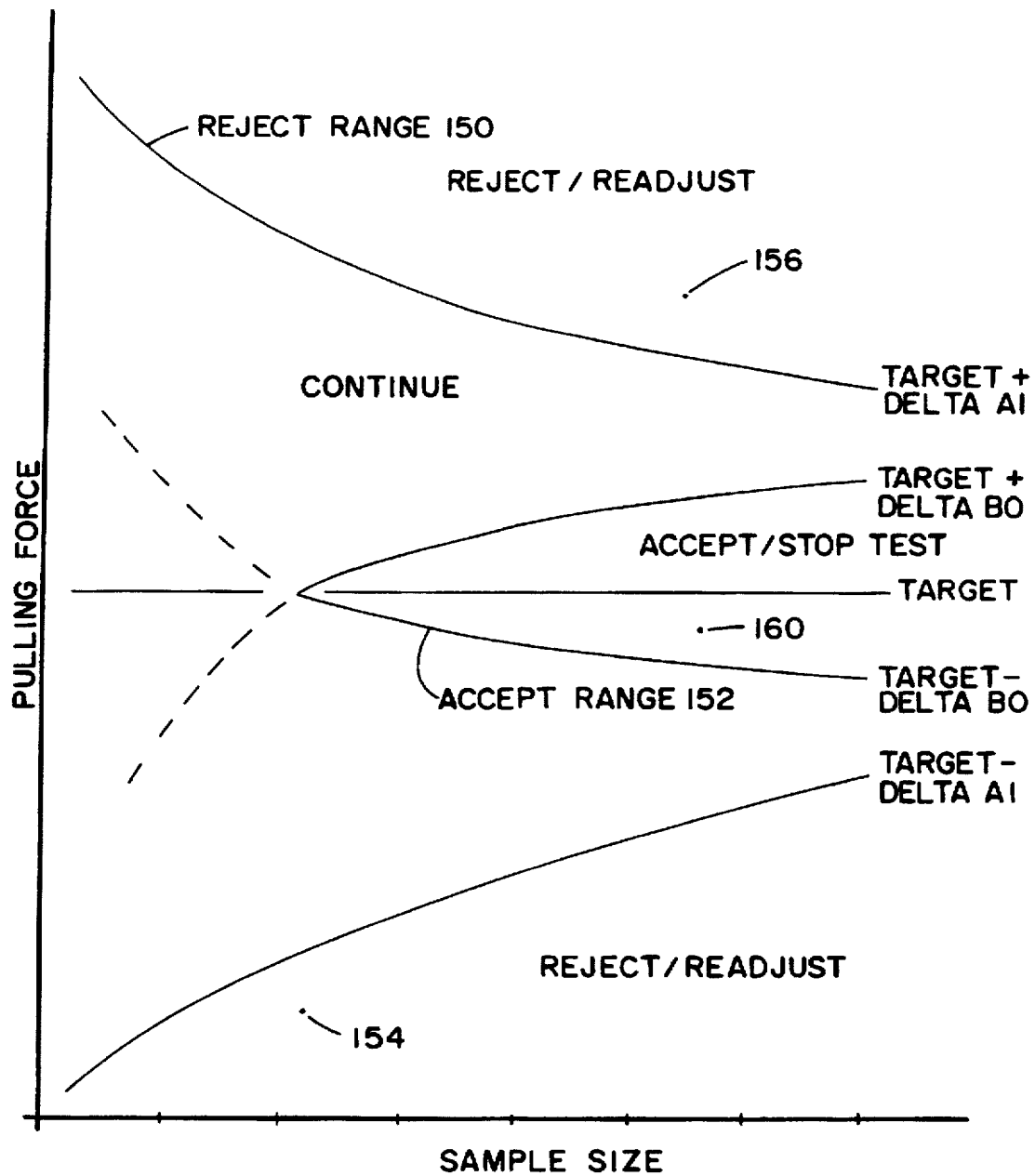
FIG. 9 is a graph illustrating the tolerance and acceptance ranges used in the subroutine of FIG. 7.

Generally, in the operation of subroutine 72, the peak forces required to break the sutures during the pull tests are added to a data base; and each time a value, or sample, is added to that data base, an average of all the sample values in the data base is calculated. These calculated average values are compared to first and second ranges, shown at 150 and 152 in FIG. 9, and referred to as reject and accept ranges, respectively. More specifically, each calculated average value is compared to the reject range, which is relatively broad. If any calculated average value falls outside that reject range, for example as shown at 154 and 156, then the swaging pressure is adjusted and the subroutine 72 is restarted, with a new, or empty, data base.

In addition to the foregoing, once the sample reaches a given size, such as eight or nine samples, the calculated average values are also compared to the accept range 152, which is within and narrower than the reject range 150. If a calculated average value is within this second range, for example as shown at 160 in FIG. 9, the swaging pressure is considered acceptable and the subroutine 72 terminates immediately. If the number of samples in the data base reaches a preset maximum number, such as twenty-eight, and none of the average values calculated from that data base have been within the accept range, the procedure is restarted with a new, or empty data base.

With reference again to FIG. 7, at step 164 of subroutine 72, various values are determined. In particular, the current sample size is obtained, the relevant range limits, also referred to as threshold limits, are determined, and the average of the pulling force values in the sample is determined.

At step 166, processor 40 tests to determine whether several conditions are met. Specifically, the processor determines, first, whether their exist a valid acceptance range (such as greater than 1) for the sample size, and second, whether the last suture pull test was a valid test. Like at step 66, the processor at step 166 determines whether the suture pull test is valid by determining whether the peak pulling force is greater than a preset value such as twenty grams. At step 166, the processor also determines whether the size of the sample has become larger than a given value such as nine, and whether the calculated average pulling force is within the accept range. If all of these conditions are met, the swaging pressure is acceptable and, as represented by step 172, the destructive pull testing is stopped. Subroutine 72 ends and the subroutine returns to the start step.

However, if at step 166, one of the conditions is not met, then subroutine 72 moves to step 176, where the processor 40 tests to determine if the maxcimum sample size has been reached; and, specifically, the processor compares the size of the sample to a predetermined value, such as twenty-eight. If the sample has reached the maximum size, the processor then, at step 180, compares the calculated average value for the sample to the accept range. If the calculated average is above or below the accept range, then the swaging pressure is decreased or increased, respectively, at steps 182 or 184. The subroutine then goes to step 186, where the suture destruct bit is set, so that the destructive pull test is applied to the next needle located at station 30, and then the subroutine returns to the starting step.

If, at step 176, the sample size is less than its maximum size, the subroutine 72 proceeds to step 190, and the processor detemines whether the calculated average value for the sample is within the reject range. If the calculated average value is within the reject range, subroutine 72 is repeated, as represented by step 192, and the suture destruct bit is set at step 186. As a result, a destructive pull test is performed on the next needle transferred to station 30, the peak pulling force required to break the suture is measured and recorded, and that recorded value is added to the sample, increasing the size of that sample by one.

In contrast, if at step 190 the calculated average value is outside the reject range, the swaging pressure is adjusted and the subroutine 72 is restarted. In particular, at step 196, the calculated average value is compared to a target swaging pressure, and the swaging pressure is either increased or decreased, as represented by steps 200 and 202, depending on whether the calculated average value is, respectively, below or above that target value. Then the suture destruct bit is set at step 186, and the subroutine returns to the start step. The next time a needle is transferred to station 30, a destructive pull test is performed on the needle, the peak pulling force required to break the suture on that needle is measured and recorded, that recorded value becomes the first value in a new sample, and routine 60 again proceeds through subroutine 72.

The subroutine 72 is repeated in this way until either all four of the conditions tested at step 166 are satisfied, or the sample reaches the maximum size. In the former case, the swaging pressure is accepted. In the latter case, the swaging pressure is accepted or adjusted depending on whether the last calculated average value is, respectively, within or outside the accept range. Also, with the above described routine, any appropriate procedure may be used to adjust the swaging pressure. For instance, if it is determined that the swaging pressure should be adjusted, processor 40 may generate an appropriate signal that is applied to a controller or to an assembly at the swaging station to change the swaging pressure in the desired manner.

The preferred reject and accept ranges may be determined or calculated in any suitable manner, and for example, these ranges may be determined on the basis of statistical analysis. FIG. 10 lists variables and equations that may be used to determine these ranges. In this procedure, the three statistical limits required are:

1. Die Setup Upper Control Limit,
2. Die Setup Lower Control Limit, and
3. Die Setup Sigma.

From these limits, initial program variables are calculated:

UCL=Die Setup Upper Control Limit,

LCL=Die Setup Lower Control Limit,

SIGMA=Die Setup Sigma,

TARG=(UCL+LCL)/2,

DELTA=(UCL−LCL)/2,

ALPHA=0.005,

BETA=0.01,

A=LN((1−BETA)/ALPHA),

B=LN(BETA/(1−ALPHA)),

H0=B * SIGMA$^2$/DELTA,

H1=A * SIGMA$^2$/DELTA, and

N=Current Sample Number.

These variables are them used to generate two tables with accept tolerances (DELTA0) and reject tolerances (DELTA1) for each Sample Number (N). The DELTA0 and DELTA1 thresholds are calculated, based on the statistical limits, each time a Die Setup is enabled. So, preferably, if the limits are changed, for example via a manual override condition, the Die Setup is aborted and then reenabled for the new thresholds to be calculated.

The tables are based on the following equations:

$$DELTA0_N = H0/N + DELTA/2$$
$$= B*SIGMA^2/DELTA*N + DELTA/2,$$
$$= LN(BETA/(1 - ALPHA))*$$
$$SIGMA^2/DELTA*N + DELTA/2.$$
$$DELTA1_N = H1/N + DELTA/2$$
$$= A*SIGMA^2/DELTA*N + DELTA/2,$$
$$= LN((1 - BETA)/ALPHA)*$$
$$SIGMA^2/DELTA*N + DELTA/2.$$

Once the table is completed, an accept +/− and reject +/− tolerace exists for each sample size average after each pull.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

We claim:

1. A method for establishing a pressure for swaging sutures to needles, comprising the steps of:
   a) inserting a suture into a needle;
   b) applying a variable swaging pressure to the needle to swage the needle to the suture;
   c) applying a pulling force to the suture to break the suture from the needle;
   d) measuring the pulling force required to break the suture from the needle;
   e) adding to a data base a pullng value representing the measured pulling force;
   f) caluulating an average of the pulling values in the data base;
   g) comparing calculated averge values to a first range;
   h) comparing at least selected ones of the calculated average values to a second range;
   i) for each average value compared to the first range, if the calculated average value is inside the first range, repeating steps (a)–(h); and
   j) for each average value compared to the second range, if the calculated average value is inside the second range, ending the method.

2. A method according to claim 1, wherein the second range is inside the first range.

3. A method according to claim 2, wherein the step of comparing at least selected ones of the calculated average values to the second range includes the step of comparing the calculated average values to the second range only after a predetermined number of pulling values are in the data base.

4. A method according to claim 2, wherein the size of the second range increases as the number of values in the data base increases.

5. A method according to claim 1, further including the step of
   for each average value compared to the first range, if said average value is outside said first range, then adjusting the swaging pressure;
   deleting all values from the data base; and
   repeating at least steps (a)–(h) after said deleting step.

6. A system for establishing a pressure for swaging sutures to needles, comprising:
   means to insert sutures into the needles;
   means to apply a variable swaging pressure to the needles to swage the needles to the sutures;
   means to adjust said swaging pressure;
   means to apply a pulling force to the sutures to break the sutures from the needles;
   means to measure the pulling forces required to break the sutures from the needles;
   means to hold a data base;
   means to add to the data base pulling values representing said measured pulling forces; and
   a processor including
   i) means for performing a routine to calculate an average of the pulling values in the data base, to compare the calculated average values to a first range, and to compare at least selected ones of the calculated average values to a second range, and
   ii) means to repeat said routine when one of the average values is inside the first range and outside the second range, and to terminate the routine when one of the average values is inside the second range.

7. A system according to claim 6, wherein the second range is inside the first range.

8. A system according to claim 7, wherein the size of the second range increases as the number of values in the data base increases.

9. A system according to claim 6, wherein the processor further includes means to adjust the swaging pressure and to repeat the routine when one of the average values is outside the first range.

10. A method for analyzing a needle swaging procedure, comprising the steps of:
    inserting sutures into needles;
    applying a swaging pressure to the needles to swage the needles to the sutures;
    applying pulling forces to the sutures to break the sutures from the needles;
    measuring the pulling forces required to break the sutures from the needles;
    using a first test to analyze first sets of the measured pulling forces;
    using a second test to analyze second sets of the measured pulling forces; and
    using a processor to record all the pulling forces analyzed in the first and second tests on a common table.

11. A method according to claim 10, wherein the table has separate first and second areas, and the step of using the processor includes ths step of using the processor to record all the pulling forces used in the first test in the first area of the table, and to record all the pulling forces used in the second test in the second area of the table.

* * * * *